(12) United States Patent
Holtorf et al.

(10) Patent No.: US 10,638,834 B2
(45) Date of Patent: May 5, 2020

(54) GALLEY COOLING SYSTEM AND METHOD OF OPERATING A GALLEY COOLING SYSTEM

(71) Applicant: Airbus Operations GmbH, Hamburg (DE)

(72) Inventors: Boris Holtorf, Hamburg (DE); Rodrigo Espinoza, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 266 days.

(21) Appl. No.: 14/685,744

(22) Filed: Apr. 14, 2015

(65) Prior Publication Data
US 2015/0289643 A1 Oct. 15, 2015

(30) Foreign Application Priority Data

Apr. 14, 2014 (EP) .................... 14164557

(51) Int. Cl.
*A47B 31/02* (2006.01)
*B64D 11/04* (2006.01)
*A47B 31/06* (2006.01)
*B64D 11/00* (2006.01)
*B64D 13/08* (2006.01)
(Continued)

(52) U.S. Cl.
CPC ............ *A47B 31/02* (2013.01); *A47B 31/06* (2013.01); *B64D 11/0007* (2013.01); *B64D 11/04* (2013.01); *B64D 13/08* (2013.01); *A47B 2031/002* (2013.01); *A47B 2031/023* (2013.01); *B64D 2013/0629* (2013.01)

(58) Field of Classification Search
CPC .... B64D 11/0007; B64D 11/04; B64D 13/08; A47B 2031/023
See application file for complete search history.

(56) References Cited

U.S. PATENT DOCUMENTS 4,077,228 A 3/1978 Schumacher et al.
4,361,014 A 11/1982 Blain
(Continued)

FOREIGN PATENT DOCUMENTS

DE 4340317 6/1995
DE 102006005035 9/2007
(Continued)

OTHER PUBLICATIONS

European Search Report, dated Sep. 17, 2014.

*Primary Examiner* — Filip Zec
(74) *Attorney, Agent, or Firm* — Greer, Burns & Crain, Ltd.

(57) ABSTRACT

A galley cooling system suitable for use in an aircraft comprising a cooling unit adapted to provide a cooling fluid. The trolley compartment of the galley cooling system comprises a front side access opening, a back wall arranged opposite to the front side access opening and two sidewalls. A cooling fluid inlet is provided in the region of a first sidewall of the trolley compartment, the cooling fluid inlet being connected to the cooling unit so as to supply cooling fluid provided by the cooling unit to the trolley compartment. A cooling fluid outlet is provided in the region of the first sidewall of the trolley compartment, the cooling fluid outlet being adapted to discharge cooling fluid heated upon circulating through the trolley compartment from the trolley compartment.

21 Claims, 3 Drawing Sheets

(51) Int. Cl.
*A47B 31/00* (2006.01)
*B64D 13/06* (2006.01)

(56) References Cited

U.S. PATENT DOCUMENTS

| | | | |
|---|---|---|---|
| 5,513,500 A | 5/1996 | Fischer | |
| 2008/0174789 A1 | 7/2008 | Uffenkamp | |
| 2009/0000329 A1 | 1/2009 | Colberg | |
| 2009/0301120 A1* | 12/2009 | Godecker | F25D 15/00 62/239 |
| 2010/0050665 A1* | 3/2010 | Oswald | F25D 11/003 62/89 |
| 2010/0224726 A1 | 9/2010 | Lu et al. | |
| 2010/0251737 A1 | 10/2010 | Roering | |
| 2010/0251797 A1 | 10/2010 | Sperrer | |
| 2012/0025679 A1* | 2/2012 | Roering | B64D 11/0007 312/236 |
| 2012/0217343 A1* | 8/2012 | Koschberg | B64D 11/04 244/118.5 |
| 2012/0325960 A1* | 12/2012 | Saint-Jalmes | B64D 11/00 244/118.1 |
| 2013/0169130 A1 | 7/2013 | Seeck et al. | |
| 2013/0206905 A1* | 8/2013 | Savian | B64D 11/003 244/118.5 |
| 2013/0256249 A1* | 10/2013 | Burd | B64D 11/04 211/153 |
| 2013/0260662 A1* | 10/2013 | Burd | B64D 11/0007 454/143 |
| 2013/0292102 A1* | 11/2013 | Trumper | B64D 13/08 165/168 |
| 2015/0266353 A1* | 9/2015 | Lu | B64D 11/04 62/89 |

FOREIGN PATENT DOCUMENTS

| | | |
|---|---|---|
| DE | 102009011797 | 9/2010 |
| DE | 102010031909 | 1/2012 |
| DE | 102010035372 | 3/2012 |
| EP | 2650216 | 10/2013 |
| FR | 2361847 | 3/1978 |
| FR | 2820196 | 8/2002 |
| GB | 2095387 | 9/1982 |
| WO | 2007080012 | 7/2007 |
| WO | 2012025200 | 3/2012 |

* cited by examiner

GALLEY COOLING SYSTEM AND METHOD OF OPERATING A GALLEY COOLING SYSTEM

CROSS-REFERENCES TO RELATED APPLICATIONS

This application claims the benefit of the European patent application No. 14164557.2 filed on Apr. 14, 2014, the entire disclosures of which are incorporated herein by way of reference.

BACKGROUND OF THE INVENTION

The invention relates to a galley cooling system suitable for use in an aircraft to cool trolleys containing, for example, food to be supplied to the aircraft passengers and to a method of operating a galley cooling system of this kind.

At present, in modern passenger aircraft, meals and beverages to be supplied to the aircraft passengers during flight are stored in trolleys in the region of galleys until they are delivered to the aircraft passengers by the cabin crew. It is known, for example, from DE 41 05 034 A1, to cool trolleys placed in the region of the galleys of the aircraft and used to store food to be kept cool with the aid of autonomous cooling devices which work with cold air as the cooling medium and are each equipped with their own compression refrigerating machine (air chiller). Alternatively to this, DE 43 40 317 C2, DE 10 2006 005 035 B3, WO 2007/080012 A1, DE 10 2009 011 797 A1 and US 2010/0251797 A1, for example, describe central cooling systems with a central compression refrigerating machine whose refrigerating capacity is distributed via a cooling circuit to a plurality of cooling stations arranged in the region of the aircraft galleys. The cooling stations supplied with cooling energy by the central refrigerating machine release this cooling energy to trolleys placed in the region of the galleys of the aircraft and used to store food which is to be kept cool, via cooling air circuits which are thermally coupled to the cooling circuit via corresponding heat exchangers.

Irrespective of whether the cooling energy required for cooling the food to be kept cool is provided by an autonomously working air chiller or a central cooling system of the aircraft, two different systems for supplying cooling air to the food to be cooled may be used, which are described, for example, in DE 10 2010 031 909 A1 and WO 2012/025200 A1. So-called air-over systems comprise a heat-insulated cooling chamber sealed against leakages, through which flows cooling air provided by the air chiller or the central cooling system. The trolleys loaded with the food to be cooled can be pushed into the cooling chamber. Trolleys suitable for use in an air-over system are not insulated themselves, but rather have air openings which allow unhindered circulation of cooling air from the cooling chamber through the trolleys and consequently over the food held in the trolleys which is to be cooled. By contrast, in so-called air-through systems, the trolleys are connected to the air chiller or a cooling station of the central cooling system via corresponding cooling air connections provided on the trolleys, so that the cooling air provided by the air chiller or the central cooling system can be passed directly through the trolleys. To avoid losses of cooling energy, trolleys provided for use in an air-through system must be provided with heat insulation and be sealed against leakages.

A cooling arrangement wherein the air-through principle is combined with an air-over system is described in EP 2 650 216 A1 and US 2013/292102 A2. In the cooling arrangement of EP 2 650 216 A1 and US 2013/292102 A2 a cooling fluid is circulated through a trolley received within a galley compartment via a cooling fluid inlet and a cooling fluid outlet of the trolley. In addition thereto, the galley compartment accommodating the trolley is provided with a cooling air inlet for supplying cooling air to the compartment and a cooling air outlet for discharging the cooling air from the compartment.

SUMMARY OF THE INVENTION

The invention is directed to an object of providing a galley cooling system suitable for use in an aircraft which allows cooling at least one trolley containing, for example, food to be supplied to the aircraft passengers in an effective manner and which efficiently utilizes the available installation space. Furthermore, the invention is directed to an object of specifying a method of operating a galley cooling system of this kind.

A galley cooling system according to the invention which is suitable for use in an aircraft, for example, to cool food to be supplied to the aircraft passengers, but also for other purposes, comprises a cooling unit adapted to provide a cooling fluid. The cooling fluid supplied provided by the cooling unit preferably is ambient air which, upon flowing through a heat exchanger, is supplied with cooling energy and hence cooled. For example, a refrigerant which is cooled to a temperature of approximately −9° C. may be guided through the heat exchanger of the cooling unit so as to cool the cooling fluid. The cooling unit may be designed in the form of an autonomously working air chiller or may be connected to a central refrigerating machine of a central cooling system via a suitable cooling circuit.

The galley cooling system further comprises a trolley compartment adapted to accommodate at least one trolley which may, for example, be loaded with food or other items which require appropriate cooling. Preferably, the trolley compartment forms a compartment of an aircraft galley which may be arranged in a lower section of the aircraft galley in order to allow a trolley, which typically is equipped with wheels, to be pushed into the compartment in an easy and convenient manner. The trolley compartment comprises a front side access opening, a back wall arranged opposite to the front side access opening and two sidewalls. Preferably, the sidewalls extend at an angle of approximately 90° relative to the back wall and substantially parallel to each other. The trolley compartment may further comprise a door for closing the front side access opening. Moreover, the trolley compartment may be sealed against the ambient, for example, by means of a sealing system described in DE 10 2010 031 909 A1 and WO 2012/025200 A1.

A cooling fluid inlet is provided in the region of a first side wall of the trolley compartment. The cooling fluid inlet is connected to the cooling unit so as to supply cooling fluid provided by the cooling unit to the trolley compartment. In addition, a cooling fluid outlet is provided in the region of the first side wall of the trolley compartment. The cooling fluid outlet is adapted to discharge a cooling fluid heated upon circulating through the trolley compartment from the trolley compartment. Preferably, the cooling fluid outlet is connected to the cooling unit. Cooling fluid heated upon circulating through the trolley compartment then may be circulated back to the cooling unit, cooled again and reused for further cooling the trolley compartment.

The cooling fluid inlet and/or the cooling fluid outlet may be designed in the form of a slit or may comprise a plurality of slits or openings and may be arranged so as to extend substantially parallel to a longitudinal axis of the trolley compartment along the first side wall. Preferably, the cooling fluid inlet and/or the cooling fluid outlet extend(s) over at least two thirds of a length of the trolley compartment along the longitudinal axis of the trolley compartment. This design of the cooling fluid inlet and/or the cooling fluid outlet ensures an even distribution of the cooling fluid along the longitudinal axis of the trolley compartment upon being supplied to and/or upon being discharged from the trolley compartment.

Cooling fluid supplied to the trolley compartment via the cooling fluid inlet flows out of the cooling fluid inlet provided in the region of the first side wall of the trolley compartment and in the direction of a second side wall of the trolley compartment which is arranged opposite to the first side wall. The cooling fluid thus is effectively distributed within the trolley compartment in a direction perpendicular to the longitudinal axis of the trolley compartment. After flowing through the trolley compartment, the cooling fluid is discharged from the trolley compartment via the cooling fluid outlet which is also arranged in the region of the first side wall of the trolley compartment, i.e., the cooling fluid, after flowing through the trolley compartment is guided back in the direction of the first sidewall before it is discharged from the trolley compartment via the cooling fluid outlet. The galley cooling system therefore is particularly suitable to effectively cool at least one trolley received within the trolley compartment.

The cooling fluid inlet and/or the cooling fluid outlet may directly be connected to the cooling unit. In this case, the galley cooling system is particularly suitable for installation in an aircraft galley, wherein installation space for installing the cooling unit is available adjacent to the first sidewall of the trolley compartment. Alternatively, in the galley cooling system, a manifold and/or duct for supplying cooling fluid from the cooling unit to the cooling fluid inlet and/or a manifold and/or duct for receiving cooling fluid discharged from the trolley compartment via the cooling fluid outlet may be provided in the region of the first side wall of the trolley compartment. This arrangement is particularly advantageous in case the installation space in the region of the back wall of the trolley compartment is limited, whereas installation space for installing the manifolds and/or ducts is available in the region of the first side wall of the trolley compartment.

An inlet manifold connecting the cooling fluid inlet to the cooling unit may have a first section extending along an outer surface of the first side wall of the trolley compartment and a second section extending along an inner surface of a back wall of a compartment arranged beside the trolley compartment. Similarly, an outlet manifold connecting the cooling fluid outlet to the cooling unit may have a first section extending along an outer surface of the first side wall of the trolley compartment and a second section extending along an inner surface of a back wall of a compartment arranged beside the trolley compartment. The manifold(s) then is/are particularly suitable to connect the cooling fluid inlet and/or the cooling fluid outlet to a cooling unit mounted beside the compartment disposed beside the trolley compartment. The compartment beside the trolley compartment may be designed in the form of a further trolley compartment which, however, is not cooled. It is, however, also conceivable, to also cool the compartment beside the trolley compartment.

In a preferred embodiment of the galley cooling system, the cooling fluid inlet is provided in a lower region of the first side wall, i.e., in a region of the first side wall which is arranged close to a floor of an aircraft cabin when the galley cooling system is installed in an aircraft. The cooling fluid outlet may be provided in an upper region of the first side wall, i.e., a region of the first side wall which is arranged close to a top wall forming an upper limitation of the trolley compartment. Cooled cooling fluid then may be guided into a lower region of the trolley compartment, whereas cooling fluid which has been heated due to the transfer of thermal energy from a trolley arranged within the trolley compartment is discharged from an upper region of the trolley compartment. The direction of flow of the cooling fluid then may follow a direction of flow induced by thermal convection allowing a conveying device for conveying the cooling fluid through the trolley compartment to be operated in an efficient manner. As an alternative, it is, however, also possible to arrange the cooling fluid inlet in an upper region of the first side wall and to arrange the cooling fluid inlet in a lower region of the first side wall.

The galley cooling system may comprise a control unit, in particular an electronic control unit, for controlling the supply of cooling fluid to the trolley compartment. For example, the control unit may be adapted to control a conveying device for conveying the cooling fluid through the trolley compartment, wherein the conveying device may be designed in the form of a blower or fan. Furthermore, the control unit may be adapted to control further flow guiding elements such as, for example, valves or movable flow defecting elements.

Specifically, the control unit preferably is adapted to control a volume flow, a speed and/or a direction of flow of the cooling fluid supplied to the trolley compartment from the cooling unit in such a manner that the cooling fluid entering the trolley compartment via the cooling fluid inlet is guided from the first side wall of the trolley compartment through a lower region of the trolley compartment in the direction of a second sidewall of the trolley compartment, and thereafter is deflected about approximately 90° and guided across an inner surface of the second sidewall of the trolley compartment. In addition, the control unit may be adapted to control the volume flow, the speed and/or the direction of flow of the cooling fluid supplied to the trolley compartment from the cooling unit in such a manner that, after flowing across the inner surface of the second sidewall of the trolley compartment, the flow of cooling fluid again is deflected about approximately 90° so as to flow through an upper region of the trolley compartment along an inner surface of the top wall of the trolley compartment back in the direction of the first sidewall of the trolley compartment.

In case at least one trolley is accommodated within the trolley compartment, the control unit thus may be adapted to control the volume flow, the speed and/or the direction of flow of the cooling fluid supplied to the trolley compartment from the cooling unit in such a manner that the cooling fluid entering the trolley compartment via the cooling fluid inlet is guided across an outer surface of a bottom wall of the trolley received within the trolley compartment, thereafter is guided across an outer surface of a side wall of the trolley which faces away from the first side wall of the trolley compartment, and finally is guided across an outer surface of a top wall of a trolley. This allows an evenly and effective cooling of the trolley and hence the items stored within the trolley.

Furthermore, the development of a large thermal gradient along the longitudinal axis of the trolley compartment is prevented. This is particularly advantageous in case a trolley accommodated within the trolley compartment is designed in the form of a long trolley, i.e., has a length in the direction of the longitudinal axis of the trolley compartment which is significantly larger than a width of the trolley in a direction perpendicular to the longitudinal axis of the trolley compartment, or in case a plurality of trolleys arranged in a row one behind another along the longitudinal axis of the trolley compartment is accommodated within the trolley compartment, wherein the row of trolleys has a length in the direction of the longitudinal axis of the trolley compartment which is significantly larger than a width of the row of trolleys in a direction perpendicular to the longitudinal axis of the trolley compartment.

The trolley compartment may in particular be designed so as to receive a plurality of trolleys arranged one behind another in a row with their side walls extending substantially parallel to the side walls of the trolley compartment. The trolley compartment then is particularly suitable for use in the galley of a modern passenger aircraft, wherein the crew faces increased catering volumes due to the large number of passengers on board the aircraft. For example, the trolley compartment may be designed so as to receive three standard half-sized trolleys arranged in a row one behind another. Alternatively or additionally thereto, the trolley compartment may be designed so as to receive a plurality of trolleys arranged side by side with their side walls extending substantially parallel to the side walls of the trolley compartment. In a particularly preferred embodiment of the galley cooling system, the trolley compartment is designed so as to receive two rows of standard half-sized trolleys in a side by side arrangement, wherein the side walls of the trolleys extend substantially parallel to the side walls of the trolley compartment.

In particular, in case the trolley compartment is designed so as to receive a plurality of trolleys arranged side by side, the control unit preferably is adapted to control the volume flow, the speed and/or the direction of flow of the cooling fluid supplied to the trolley compartment from the cooling unit in such a manner that the cooling fluid entering the trolley compartment via the cooling fluid inlet is guided through a gap existing between the trolleys arranged within the trolley compartment side by side so as to flow across outer surfaces of the side walls of the trolleys. In other words, the control unit may be adapted to control the operation of a conveying device and/or other suitable means for guiding the flow of cooling fluid through the trolley compartment in such a manner that the flow of cooling fluid, after flowing across the outer surface of a bottom wall of a trolley arranged adjacent to the cooling fluid inlet is divided into a first partial flow and a second partial flow.

The first partial flow may flow through the gap between the trolley arranged adjacent to the cooling fluid inlet and a further trolley arranged remote from the cooling fluid inlet. After passing through the gap between the adjacent trolleys, the first partial flow may be guided across the outer surface of the top wall of the trolley arranged adjacent to the cooling fluid inlet and finally enter the cooling fluid outlet. Contrary thereto, the second partial flow may flow across the outer surface of the bottom wall of the trolley arranged remote from the cooling fluid inlet and thereafter across the outer surface of the side wall of the trolley arranged remote from the cooling fluid inlet which faces the second sidewall of the trolley compartment. After passing a gap existing between the sidewall of the trolley arranged remote from the cooling fluid inlet and the second sidewall of the trolley compartment, the second partial flow may flow across the outer surface of the top wall of the trolley arranged remote from the cooling fluid inlet and thereafter across the outer surface of the top wall of the trolley arranged adjacent to the cooling fluid inlet before it is discharged from the trolley compartment via the cooling fluid outlet.

In the embodiments of a galley cooling system described above, the cooling fluid flow basically is circulated through the trolley compartment in such a manner that the cooling fluid flow, in the region of the second sidewall of the trolley compartment and/or in the region of the gap existing between trolleys arranged within the trolley compartment side by side flows in an upward direction from a lower region of the trolley compartment to an upper region of the trolley compartment. This typically requires the cooling fluid inlet to be provided in a lower region of the first side wall of the trolley compartment and the cooling fluid outlet to be provided in an upper region of the first side wall of the trolley compartment.

As already indicated above, it is, however, also conceivable to arrange the cooling fluid inlet in an upper region of the first side wall and to arrange the cooling fluid outlet in a lower region of the first side wall. The control unit then preferably controls the volume flow, the speed and/or the direction of flow of the cooling fluid supplied to the trolley compartment from the cooling unit in such a manner that the cooling fluid entering the trolley compartment via the cooling fluid inlet is guided in the region of the second sidewall of the trolley compartment and/or in the region of the gap existing between trolleys arranged within the trolley compartment side by side flows in an downward direction from an upper region of the trolley compartment to a lower region of the trolley compartment.

In a preferred embodiment of the galley cooling system, at least one guiding element may be mounted to an inner surface of at least one of the side walls of the trolley compartment. The guiding element may extend over at least two thirds of the length of the trolley compartment along the longitudinal axis of the trolley compartment.

Preferably, at least one guiding element is mounted to each side wall of the trolley compartment. In a particularly preferable embodiment of the galley cooling system, guiding elements are provided in a lower and an upper region, respectively, of each side wall of the trolley compartment. The guiding element(s) may comprise a guiding surface adapted to interact with the side wall of a trolley when the trolley is pushed into the galley compartment. Preferably, at least the guiding surface of the guiding element is made of a flexible material, for example an elastomeric polymer material or a rubber. The at least one guiding element then may guide the movement of the trolley upon being pushed into the galley compartment without damaging the trolley or the galley compartment side wall and without being damaged because of the interaction with the trolley.

The guiding element, in the region of a mounting surface facing the side wall of the trolley compartment, may be provided with at least one recess allowing a flow of cooling fluid therethrough. Hence, the guiding element does not hinder the flow of cooling fluid through the trolley compartment and in particular across the side wall of a trolley arranged within the trolley compartment, but instead even acts as a kind of flow-guiding element. Preferably, a plurality of recesses are formed in the region of the mounting surface of the guiding element, wherein the recess(es) in particular has/have a depth which may extend over two thirds of the overall depth of the guiding element. For example, a guiding element having an overall depth in a direction perpendicular to the longitudinal axis of the trolley compartment of 9 mm may be provided with at least one recess having a depth of 6 mm.

The galley cooling system preferably further comprises at least one further guiding element which may extend from an inner surface of a top wall of the trolley compartment. The further guiding element may comprise two substantially parallel guiding surfaces adapted to interact with the side walls of trolleys to be arranged in the galley compartment side by side when the trolleys are pushed into the trolley compartment. The guiding surfaces of the further guiding element may also be made of a flexible material such as, for example, an elastomeric polymeric material or a rubber. The further guiding element may extend from the inner surface of the trolley compartment top wall in a direction parallel to the longitudinal axis of the trolley compartment and over at least two thirds of the length of the trolley compartment along the longitudinal axis of the trolley compartment so as to extend into the gap existing between trolleys arranged within the trolley compartment side by side.

The further guiding element preferably is provided with at least one through-hole allowing a flow of cooling fluid therethrough. The through-hole formed in the further guiding element ensures that the flow of cooling fluid through the trolley compartment is not affected by the further guiding element, but instead is guided in a desired manner. Preferably, a plurality of through-holes is formed in the further guiding element, wherein the through-holes may have a depth in a direction perpendicular to the top wall of the trolley compartment which extends along half of a depth of the further guiding element in the direction perpendicular to the top wall of the trolley compartment. For example, a further guiding element having a depth in the direction perpendicular to the top wall of the trolley compartment of 30 mm may be provided with through-holes having a depth in the direction perpendicular to the top wall of the trolley compartment of 15 mm.

In a method, according to the invention, of operating a galley cooling system suitable for use in an aircraft, a cooling fluid provided by a cooling unit is supplied to a trolley compartment. The trolley compartment comprises a front side access opening, a back wall arranged opposite to the front side access opening and two side walls. The cooling fluid is supplied to the trolley compartment via a cooling fluid inlet provided in the region of a first side wall of the trolley compartment. Furthermore, cooling fluid heated upon circulating through the trolley compartment is discharged from the trolley compartment via a cooling fluid outlet provided in the region of the first side wall of the trolley compartment.

Preferably, the cooling fluid is supplied to the trolley compartment via a cooling fluid inlet provided in a lower region of the first side wall. The cooling fluid may be discharged from the trolley compartment via a cooling fluid outlet provided in an upper region of the first side wall. Alternatively, the cooling fluid may be supplied to the trolley compartment via a cooling fluid inlet provided in a lower region of the first side wall, whereas the cooling fluid may be discharged from the trolley compartment via a cooling fluid outlet provided in an upper region of the first side wall.

A volume flow, a speed and/or a direction of flow of the cooling fluid supplied to the trolley compartment from the cooling unit may be controlled in such a manner that the cooling fluid entering the trolley compartment via the cooling fluid inlet is guided across an outer surface of a bottom wall of a trolley received within the trolley compartment, thereafter is guided across an outer surface of a side wall of the trolley which faces away from the first side wall of a trolley compartment, and finally is guided across an outer surface of a top wall of the trolley.

The trolley compartment may be designed so as to receive a plurality of trolleys arranged one behind another in a row with their side walls extending substantially parallel to the side walls of the trolley compartment. Alternatively or additionally thereto, the trolley compartment may be designed so as to receive a plurality of trolleys arranged side by side with their side walls extending substantially parallel to the side walls of the trolley compartment. The volume flow, the speed and/or the direction of flow of the cooling fluid supplied to the trolley compartment may be controlled in such a manner that the cooling fluid entering the trolley compartment via the cooling fluid inlet is guided through a gap existing between trolleys arranged within the trolley compartment side by side so as to flow across outer surfaces of the side walls of the trolleys.

A flow of cooling fluid may be guided through at least one recess provided in the region of a mounting surface of least one guiding element mounted to an inner surface of at least one of the side walls of the trolley compartment. The mounting surface of the at least one guiding element may face the side wall of the trolley compartment. The guiding element may further comprise a guiding surface adapted to interact with the side wall of a trolley when the trolley is pushed into the galley compartment.

A flow of cooling fluid may be guided through at least one through-hole provided in at least one further guiding element extending from an inner surface of a top wall of the trolley compartment. The further guiding element may comprise two substantially parallel guiding surfaces which are adapted to interact with the side walls of trolleys to be arranged in the galley compartment side by side when the trolleys are pushed into the trolley compartment.

BRIEF DESCRIPTION OF THE DRAWINGS

A preferred embodiment of the invention will now be explained in more detail with reference to the appended schematic drawings, wherein.

DETAILED DESCRIPTION OF THE PREFERRED EMBODIMENTS

Figure 1:
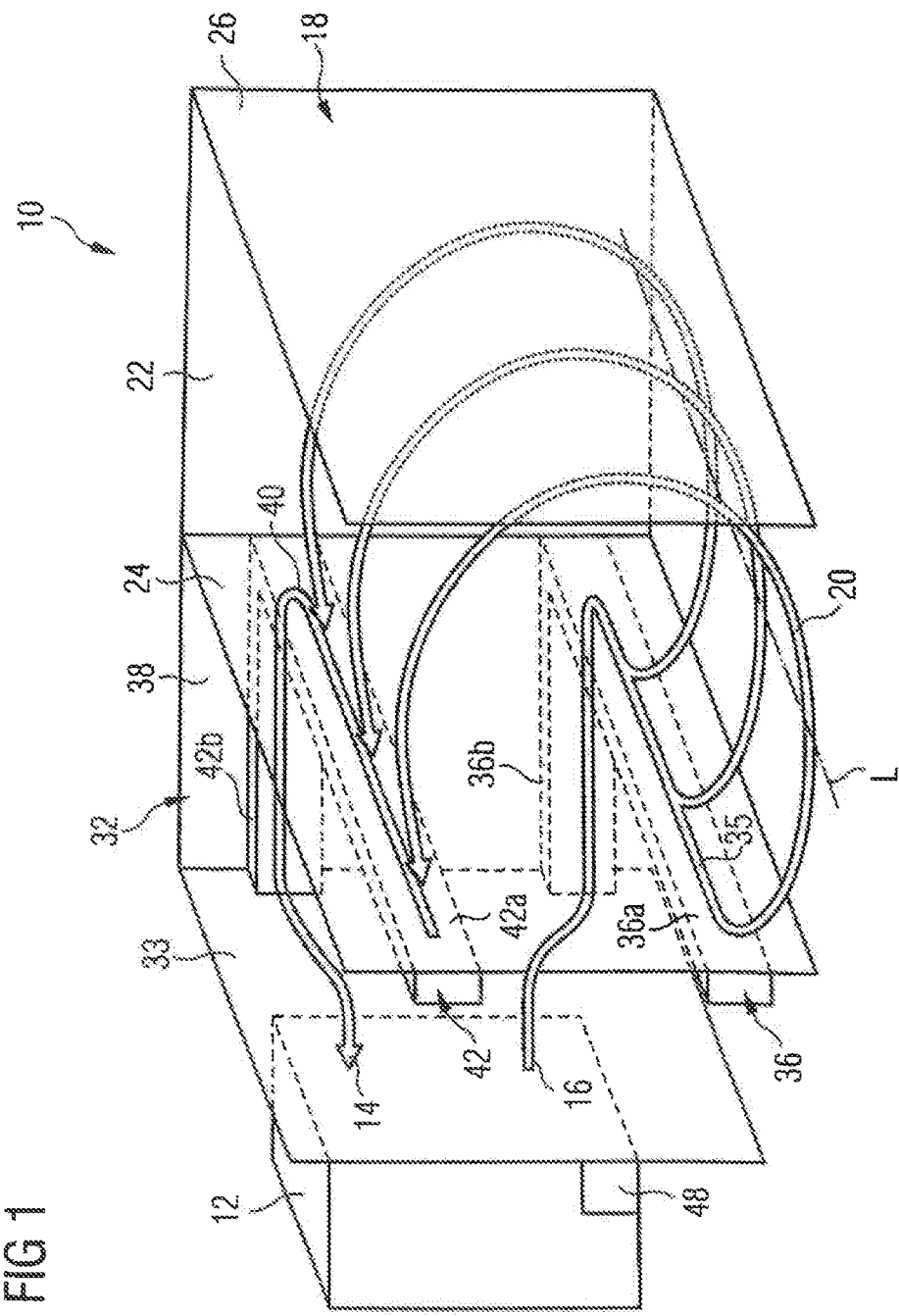
FIG. 1 shows a three-dimensional view of a galley cooling system suitable for use on board an aircraft for cooling food to be supplied to the aircraft passengers.
Figure 2:
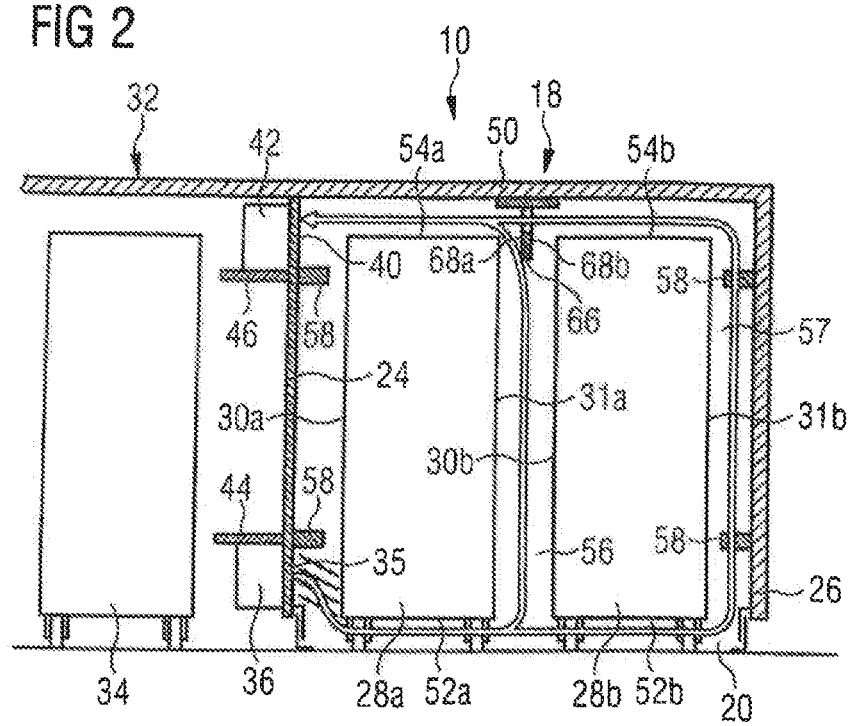
FIG. 2 shows a partial front view of the galley cooling system according to FIG. 1.
Figure 3:
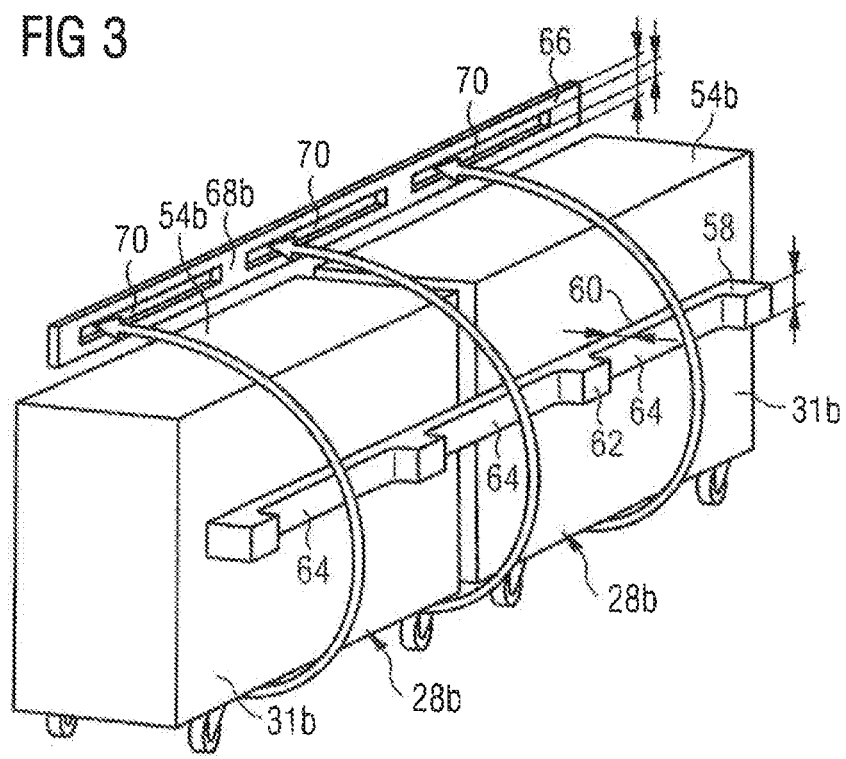
FIG. 3 shows a detailed three-dimensional view of the galley cooling system according to FIG. 2.
Figure 4:
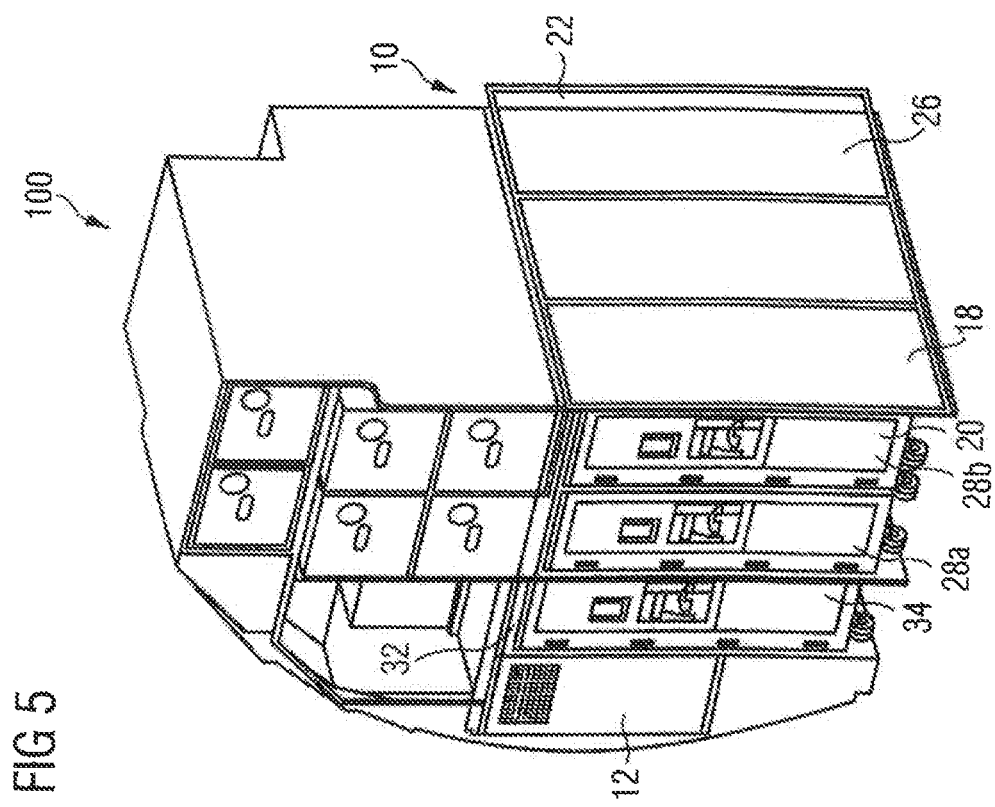
FIG. 4 shows a front view of an aircraft galley equipped with the galley cooling system according to FIGS. 1 to 3.
Figure 5:
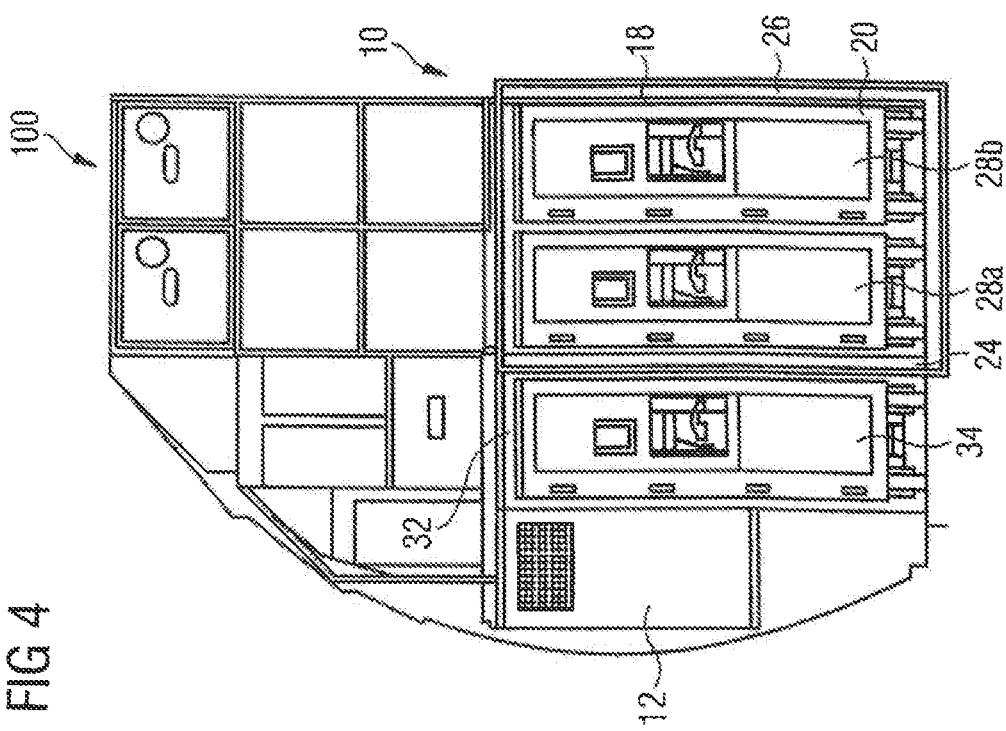
FIG. 5 shows a three-dimensional view of the aircraft galley according to FIG. 4.

FIGS. 1 to 3 show a galley cooling system 10 suitable for use in an aircraft galley 100 as depicted in FIGS. 4 and 5. The galley cooling system 10 comprises a cooling unit 12 which is adapted to provide a cooling fluid. In the embodiment of a galley cooling system 10 depicted in FIGS. 1 to 3, the cooling unit 12 is designed in the form of an air chiller and adapted to provide cooled ambient air. In particular, ambient air enters the cooling unit 12 via a cooling unit inlet 14 and, in the cooling unit 12, is guided through a heat exchanger (not shown). Upon flowing through the heat exchanger of the cooling unit 12, the ambient air is cooled and exits the cooling unit 12 at a cooling unit outlet 16 with a desired low temperature.

The galley cooling system 10 further comprises a trolley compartment 18. The trolley compartment 18 comprises a front side access opening 20, a back wall 22 which is arranged opposite to the front side access opening 20 and two side walls 24, 26. The side walls 24, 26 of the trolley compartment 18 extend substantially parallel to each other, parallel to a longitudinal axis L of the trolley compartment 18 and substantially perpendicular to the back wall 22. The trolley compartment 18 further comprises a door (not shown in the drawings) which is adapted to close the front side access opening 20 of the trolley compartment 18 in a sealed manner.

As becomes apparent from FIGS. 2, 4 and 5, the trolley compartment 18 is designed so as to receive six half-sized trolleys 28a, 28b. Three trolleys 28a are arranged one behind another in a first row with their side walls 30a, 31a extending substantially parallel to the side walls 24, 26 of the trolley compartment 18. Moreover, three trolleys 28b are arranged one behind another in a second row with their side walls 30b, 31 b extending substantially parallel to the side walls 24, 26 of the trolley compartment 18. Thus, three pairs of trolley 28a, 28b are accommodated within the trolley compartment 18, wherein each pair of trolleys 28a, 28b consists of two trolleys 28a, 28b arranged side by side with their side walls 30a, 31a, 30b, 31b extending substantially parallel to the side walls 24, 26 of the trolley compartment 18.

When the trolley compartment 18 is installed in the aircraft galley 100 as shown in FIGS. 4 and 5, the trolley compartment 18 is arranged beside a further trolley compartment 32. The cooling unit 12 is arranged adjacent to a side wall 33 of the further trolley compartment 32. It is, however, also conceivable, to arrange the cooling unit 12 at a different position, e.g., behind the trolley compartment 18 or the further trolley compartment 32, as required by the available installation space. The trolley compartment 18 thus is separated from the cooling unit 12 by the further trolley compartment 32. The further trolley compartment 32 distinguishes from the trolley compartment 18 in that it is not intended to be cooled. It is, however, also conceivable, to also cool the further compartment 32. Furthermore, the length of the further trolley compartment 32 in the direction of the longitudinal axis L of the trolley compartment 18 is shorter than that of the trolley compartment 18. The further trolley compartment 32 thus is not capable of accommodating three half-sized trolleys 28a, 28b arranged in a row one behind another, but instead is suitable to accommodate one full-sized trolley 34 only. Of course, instead of the full-sized trolley 34, also two half-sized trolleys may be received within the further trolley compartment 32.

As already mentioned above, the trolley compartment 18 is intended to be cooled. Therefore, the trolley compartment 18 comprises a cooling fluid inlet 35 which is provided in the region of a first side wall 24 of the trolley compartment 18. In particular, the cooling fluid inlet 35 is provided in a lower region of the first side wall 24 and extends over at least two thirds of the length of the trolley compartment 18 along the longitudinal axis L of the trolley compartment 18 parallel to the longitudinal axis L of the trolley compartment 18. The cooling fluid inlet 35 is connected to the cooling unit 12 via an inlet manifold 36. The inlet manifold 36 comprises a first section 36a extending along an outer surface of the first side wall 24 of the trolley compartment 18 in a direction parallel to the longitudinal axis L of the trolley compartment 18 and a second section 36b extending along an inner surface of a back wall 38 of the further trolley compartment 32 in a direction perpendicular to the longitudinal axis L of the trolley compartment 18. Thus, cooling fluid provided by the cooling unit 12, via the inlet manifold 36 is directed to the cooling fluid inlet 34.

Furthermore, a cooling fluid outlet 40 is provided in the region of the first side wall 24 of the trolley compartment 18. Like the cooling fluid inlet 34, also the cooling fluid outlet 40 extends over at least two thirds of the length of the trolley compartment 18 along the longitudinal axis L of the trolley compartment 18 parallel to the longitudinal axis L of the trolley compartment 18. In contrast to the cooling fluid inlet 35, the cooling fluid outlet 40, however, is arranged in an upper region of the first side wall 24 of the trolley compartment 18. While the cooling fluid inlet 35 serves to supply cooling fluid provided by the cooling unit 12 into the trolley compartment 18, the cooling fluid outlet 40 serves to discharge cooling fluid heated upon circulating through the trolley compartment 18 from the trolley compartment 18.

The cooling fluid outlet 40 opens into an outlet manifold 42. Similar to the inlet manifold 36, also the outlet manifold 42 has a first section 42a extending along the outer surface of the first sidewall 24 of the trolley compartment 18 in a direction parallel the longitudinal axis L of the trolley compartment 18 and a second section 42b which extends along an inner surface of the back wall 38 of the further trolley compartment 32 in a direction perpendicular to the longitudinal axis L of the trolley compartment 18. While the second section 36b of the inlet manifold 36 is connected to the cooling unit outlet 16, the second section 42b of the outlet manifold 42 is connected to the cooling unit inlet 14. Thus, in the galley cooling system 10 as depicted in FIGS. 1 to 5, cooling fluid heated upon flowing through the trolley compartment 18 and taking up heat from the trolleys 28a, 28b received within the trolley compartment 18 is circulated back to the cooling unit 12.

As becomes apparent in particular from FIG. 2, the inlet manifold 36 is mounted to a carrier element 44 extending from the outer surface of the first sidewall 24 of the trolley compartment 18 into the further trolley compartment 32. Similarly, the outlet manifold 42 is mounted to a further carrier element 46 extending from the outer surface of the first sidewall 24 of the trolley compartment 18 into the further trolley compartment 32. Thus, an installation space available within the further trolley compartment 32 is efficiently used for mounting the inlet manifold 36 and the outlet manifold 42 of the galley cooling system 10. As a result, the entire length of the trolley compartment 18 along the longitudinal axis L thereof can be used for accommodating the trolleys 28a, 28b. The galley cooling system 10 therefore is particularly advantageous for use on board a passenger aircraft with high catering demands, for example due to a high number of passengers being present on board the aircraft.

The flow of cooling fluid through the trolley compartment 18 is controlled by means of a control unit 48. In particular, the control unit 48 serves to control the operation of a conveying device (not shown) for conveying the cooling fluid through the trolley compartment 18. The conveying device may be designed in the form of a blower of a fan. Furthermore, the control unit 48 may be used to control further devices for controlling the flow of the cooling fluid through the trolley compartment 18 such as, for example, valves, flow deflecting elements and the like.

As becomes apparent from FIG. 1, the control unit 48 controls a volume flow, a speed and a direction of flow of the cooling fluid supplied to the trolley compartment 18 from the cooling unit 12 in such a manner that the cooling fluid entering the trolley compartment 18 via the cooling fluid inlet 35 is guided through a lower region of the trolley compartment 18 in the direction of a second sidewall 26 of the trolley compartment 18. The cooling fluid then is deflected about approximately 90° and flows across an inner surface of the second sidewall 26 of the trolley compartment 18. Thereafter, it is again deflected about approximately 90° and flows across an inner surface of a top wall 50 of the trolley compartment 18 in the direction of the cooling fluid outlet 40.

Hence, when trolleys 28*a*, 28*b* are accommodate within the trolley compartment 18, the cooling fluid is guided across an outer surface of bottom walls 52*a*, 52*b* of the trolleys 28*a*, 28*b*. Thereafter, the cooling fluid is guided across an outer surface of the sidewalls 31*a*, 31*b* of the trolleys 28*a*, 28*b* which face away from the first sidewall 24 of the trolley compartment 18. Finally, the cooling fluid is guided across an outer surface of top walls 54*a*, 54*b* of the trolleys 28*a*, 28*b*.

As becomes apparent from FIG. 2, the flow of cooling fluid, under the control of the control unit 48, after flowing across the outer surface of the bottom wall 52*a* of the trolley 28*a* arranged adjacent to the cooling fluid inlet 35 is divided into a first partial flow and a second partial flow. The first partial flow of the cooling fluid is guided is through a gap 56 existing between the trolleys 28*a*, 28*b* such that the first partial flow of the cooling fluid flows across adjacent sidewalls 31*a*, 30*b* of the trolleys 28*a*, 28*b*. After passing through the gap 56 between the adjacent trolleys 28*a*, 28*b*, the first partial flow of the cooling fluid is guided across the outer surface of the top wall 54*a* of the trolley 28*a* arranged adjacent to the cooling fluid inlet 35 and finally enters the cooling fluid outlet 40. The second partial flow flows across the outer surface of the bottom wall 52*b* of the trolley 28*b* arranged remote from the cooling fluid inlet 35 and thereafter across the outer surface of the side wall 31*b* of the trolley 28*b* arranged remote from the cooling fluid inlet 35 which faces the second sidewall 26 of the trolley compartment 18. After passing a gap 57 existing between the sidewall 31*b* of the trolley 28*b* arranged remote from the cooling fluid inlet 35 and the second sidewall 26 of the trolley compartment 18, the second partial flow flows across the outer surface of the top wall 54*b* of the trolley 28*b* arranged remote from the cooling fluid inlet 35 and thereafter across the outer surface of the top wall 54*a* of the trolley 28*a* arranged adjacent to the cooling fluid inlet 35 before it is discharged from the trolley compartment 18 via the cooling fluid outlet 40.

Although not indicated in the drawings, a further partial flow of the cooling fluid develops in the region adjacent to the cooling fluid inlet 35 and the cooling fluid outlet, i.e., across the sidewalls 30*a* of the trolleys 28*a*, although this partial flow might be disturbed to a certain extend by the supply of cooling fluid via the cooling fluid inlet 35 and the discharge of cooling fluid via the cooling fluid outlet 40. In addition, cooling fluid flows develop between the door of the trolley compartment 18 and a front wall of the trolleys 28*a*, 28*b* arranged adjacent to the door as well as between the trolleys 28*a*, 28*b* arranged in row one behind the other, i.e., between a backwall of a trolley 28*a*, 28*b* arranged closer to the trolley compartment door and a front wall of a trolley 28*a*, 28*b* arranged further remote from the trolley compartment door.

As depicted in FIG. 2, two guiding elements 58 are mounted to the inner surface of each sidewall 24, 26 of the trolley compartment 18. Each guiding element 58 extends substantially parallel to the longitudinal axis L of the trolley compartment 18 over at least two thirds of the length of the trolley compartment 18 in the direction of the longitudinal axis L of the trolley compartment 18. Each guiding element 58 comprises a guiding surface 60 made of a flexible material which is adapted to interact with the sidewalls 30*a*, 31*a*, 30*b*, 31*b* of the trolleys 28*a*, 28*b* when the trolleys 28*a*, 28*b* are pushed into the trolley compartment 18. Furthermore, each guiding element 58 comprises a mounting surface 62 which faces the inner surface of the respective sidewall 24, 26 of the trolley compartment 18. In the region of the mounting surface 62, the guiding elements 58 are provided with a plurality of recesses 64. The recesses 64 allow a flow of cooling fluid therethrough, thus ensuring that the flow of cooling fluid through the trolley compartment 18 is not affected by the guiding elements 58. The recesses 64 have a depth in a direction perpendicular to the longitudinal axis L of the trolley compartment 18 which extends over two thirds of the overall depth of the guiding element 58 in the direction perpendicular to the longitudinal axis L of the trolley compartment 18.

A further guiding element 66 extends from an inner surface of the top wall 50 of the galley compartment 18. In particular, the further guiding element 66 extends substantially perpendicular to the inner surface of the top wall 50 of the trolley compartment 18 and comprises two substantially parallel guiding surfaces 68*a*, 68*b* which, like the guiding surface 60 of each guiding element 58, is made from a flexible material. The guiding surfaces 68*a*, 68*b* of the further guiding element 66 are adapted to interact with the sidewalls 30*a*, 31*a*, 30*b*, 31*b* of the trolleys 28*a*, 28*b* when the trolleys 28*a*, 28*b* are pushed into the trolley compartment 18. The further guiding element 66 thus extends into the gap 56 existing between the trolleys 28*a*, 28*b* arranged within the trolley compartment 18 side by side.

The further guiding element 66 is provided with a plurality of through-holes 70. Similar to the recesses 64 formed in the mounting surface 62 of each guiding element 58, the through-holes 70 extending through the further guiding element 66 ensure an unhindered flow of cooling fluid through the trolley compartment 18. The through-holes 70 have a depth in a direction perpendicular to the top wall 50 of the trolley compartment 18 which extends along half of a depth of the further guiding element 66 in the direction perpendicular to the top wall 50 of the trolley compartment 18.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A galley cooling system, the galley cooling system comprising:
   a cooling unit configured to provide a cooling fluid, and
   a trolley compartment configured to receive a predetermined maximum number of trolleys comprising a front side access opening, a back wall arranged opposite to the front side access opening and two sidewalls, wherein a cooling fluid inlet is provided in the first side wall of the trolley compartment, the cooling fluid inlet being connected to the cooling unit so as to supply cooling fluid provided by the cooling unit to the trolley compartment, and wherein a cooling fluid outlet is provided in the first side wall of the trolley compartment, the cooling fluid outlet being adapted to discharge cooling fluid heated upon circulating through the trolley compartment from the trolley compartment, and wherein the galley cooling system further comprises a control unit which is adapted to control at least one of a volume flow, a speed and a direction of flow of the cooling fluid supplied to the trolley compartment from the cooling unit in such a manner that the cooling fluid entering the trolley compartment via the cooling fluid inlet is guided across an outer surface of a trolley received within the trolley compartment in the case the predetermined maximum number of trolleys is received within the trolley compartment, the control unit being configured to control the direction of flow of the cooling fluid supplied to the trolley compartment from the cooling unit in such a manner that the cooling fluid entering the trolley compartment via the cooling fluid inlet is guided first across an outer surface of a bottom wall of a trolley received within the trolley compartment, thereafter is guided across an outer surface of a side wall of the trolley which faces away from the first side wall of the trolley compartment, and finally is guided across an outer surface of a top wall of the trolley, wherein a guiding element extends into an interior space of the trolley compartment from a second side wall of the trolley compartment, wherein the guiding element, in the region of a mounting surface facing the sidewall of the trolley compartment is provided with at least one recess allowing a flow of cooling fluid therethrough.

2. The galley cooling system according to claim 1, wherein the cooling fluid inlet is provided in a lower region of the first side wall and wherein the cooling fluid outlet is provided in an upper region of the first side wall.

3. The galley cooling system according to claim 1, wherein the trolley compartment is configured to receive a plurality of trolleys arranged one behind another in a row with their sidewalls extending substantially parallel to the sidewalls of the trolley compartment.

4. The galley cooling system according to claim 1, wherein the trolley compartment is configured so as to receive a plurality of trolleys arranged side by side with their sidewalls extending substantially parallel to the sidewalls of the trolley compartment.

5. The galley cooling system according to claim 3, wherein the control unit is configured to control at least one of the volume flow, the speed and the direction of flow of the cooling fluid supplied to the trolley compartment from the cooling unit in such a manner that the cooling fluid entering the trolley compartment via the cooling fluid inlet is guided through a gap existing between trolleys arranged within the trolley compartment side by side so as to flow across outer surfaces of the side walls of the trolleys.

6. The galley cooling system according to claim 4, wherein the control unit is configured to control at least one of the volume flow, the speed and the direction of flow of the cooling fluid supplied to the trolley compartment from the cooling unit in such a manner that the cooling fluid entering the trolley compartment via the cooling fluid inlet is guided through a gap existing between trolleys arranged within the trolley compartment side by side so as to flow across outer surfaces of the side walls of the trolleys.

7. The galley cooling system according to claim 1, wherein the guiding element is mounted to an inner surface of the second side wall of the trolley compartment, the guiding element comprising a guiding surface configured to interact with the sidewall of a trolley when the trolley is pushed into the trolley compartment.

8. The galley cooling system according to claim 1, wherein at least one further guiding element extends from an inner surface of a top wall of the trolley compartment, the further guiding element comprising two substantially parallel guiding surfaces adapted to interact with the sidewalls of trolleys to be arranged in the trolley compartment side by side when the trolleys are pushed into the trolley compartment.

9. The galley cooling system according to claim 8, wherein the further guiding element is provided with at least one through hole allowing a flow of cooling fluid there through.

10. A method of operating a galley cooling system suitable for use in an aircraft, comprising the steps:

supplying a cooling fluid provided by a cooling unit to a trolley compartment configured to receive a predetermined maximum number of trolleys comprising a front side access opening, a back wall arranged opposite to the front side access opening and two sidewalls via a cooling fluid inlet provided in the first side wall of the trolley compartment, and discharging cooling fluid heated upon circulating through the trolley compartment from the trolley compartment via a cooling fluid outlet provided in the first side wall of the trolley compartment, controlling at least one of a volume flow, a speed and a direction of flow of the cooling fluid supplied to the trolley compartment from the cooling unit in such a manner that the cooling fluid entering the trolley compartment via the cooling fluid inlet is guided first across an outer surface of a bottom wall of a trolley received within the trolley compartment in the case the predetermined maximum number of trolleys is received within the trolley compartment, thereafter the cooling fluid is guided across an outer surface of a side wall of the trolley which faces away from the first side wall of the trolley compartment, and finally is guided across an outer surface of a top wall of the trolley, guiding a flow of cooling fluid through at least one recess provided in the region of a mounting surface of at least one guiding element mounted to an inner surface of a second side wall of the trolley compartment, wherein the mounting surface of the guiding element faces the sidewall of the trolley compartment, and wherein the guiding element further comprises a guiding surface configured to interact with the sidewall of a trolley when the trolley is pushed into the trolley compartment, wherein the guiding element, in the region of the mounting surface facing the sidewall of the trolley compartment is provided with at least one recess allowing a flow of cooling fluid therethrough.

11. The method according to claim 10, wherein the cooling fluid is supplied to the trolley compartment via a cooling fluid inlet provided in a lower region of the first side wall, and wherein the cooling fluid is discharged from the trolley compartment via a cooling fluid outlet provided in an upper region of the first side wall.

12. The method according to claim 10, wherein the trolley compartment is configured so as to receive a plurality of trolleys arranged one behind another in a row with their sidewalls extending substantially parallel to the sidewalls of the trolley compartment.

13. The method according to claim 10, wherein the trolley compartment is configured so as to receive a plurality of trolleys arranged side by side with their sidewalls extending substantially parallel to the sidewalls of the trolley compartment.

14. The method according to claim 12, including the step of controlling at least one of the volume flow, the speed and the direction of flow of the cooling fluid supplied to the trolley compartment from the cooling unit in such a manner that the cooling fluid entering the trolley compartment via the cooling fluid inlet is guided through a gap existing between trolleys arranged within the trolley compartment side by side so as to flow across outer surfaces of the side walls of the trolleys.

15. The method according to claim 13, including the step of controlling at least one of the volume flow, the speed and the direction of flow of the cooling fluid supplied to the trolley compartment from the cooling unit in such a manner that the cooling fluid entering the trolley compartment via the cooling fluid inlet is guided through a gap existing between trolleys arranged within the trolley compartment side by side so as to flow across outer surfaces of the side walls of the trolleys.

16. The method according to claim 10, including the step of guiding a flow of cooling fluid through at least one through hole provided in at least one further guiding element extending from an inner surface of a top wall of the trolley compartment, wherein the further guiding element comprises two substantially parallel guiding surfaces adapted to interact with the sidewalls of trolleys to be arranged in the trolley compartment side by side when the trolleys are pushed into the trolley compartment.

17. The galley cooling system according to claim 1, wherein the cooling fluid inlet and the cooling fluid outlet comprises one or more openings extending substantially parallel to a longitudinal axis of the trolley compartment along the first side wall.

18. A galley cooling system, the galley cooling system comprising:
a cooling unit configured to provide a cooling fluid, and
a trolley compartment configured to receive a predetermined maximum number of trolleys comprising a front side access opening, a back wall arranged opposite to the front side access opening and two sidewalls,
wherein a cooling fluid inlet is provided in the first side wall of the trolley compartment, the cooling fluid inlet being connected to the cooling unit so as to supply cooling fluid provided by the cooling unit to the trolley compartment, and
wherein a cooling fluid outlet is provided in the first side wall of the trolley compartment, the cooling fluid outlet being adapted to discharge cooling fluid heated upon circulating through the trolley compartment from the trolley compartment, and
wherein the galley cooling system further comprises a control unit which is adapted to control at least one of a volume flow, a speed and a direction of flow of the cooling fluid supplied to the trolley compartment from the cooling unit in such a manner that the cooling fluid entering the trolley compartment via the cooling fluid inlet is guided across an outer surface of a trolley received within the trolley compartment in the case the predetermined maximum number of trolleys is received within the trolley compartment,
the control unit being configured to control the direction of flow of the cooling fluid supplied to the trolley compartment from the cooling unit in such a manner that the cooling fluid entering the trolley compartment via the cooling fluid inlet is guided first across an outer surface of a top wall of a trolley received within the trolley compartment, thereafter is guided across an outer surface of a side wall of the trolley which faces away from the first side wall of the trolley compartment, and finally is guided across an outer surface of a bottom wall of the trolley,
wherein a guiding element extends into an interior space of the trolley compartment from a second side wall of the trolley compartment,
wherein the guiding element, in the region of a mounting surface facing the sidewall of the trolley compartment is provided with at least one recess allowing a flow of cooling fluid therethrough.

19. The galley cooling system according to claim 18, wherein the cooling fluid inlet is provided in an upper region of the first side wall and wherein the cooling fluid outlet is provided in a lower region of the first side wall.

20. A method of operating a galley cooling system suitable for use in an aircraft, comprising the steps:
supplying a cooling fluid provided by a cooling unit to a trolley compartment configured to receive a predetermined maximum number of trolleys comprising a front side access opening, a back wall arranged opposite to the front side access opening and two sidewalls via a cooling fluid inlet provided in the first side wall of the trolley compartment, and
discharging cooling fluid heated upon circulating through the trolley compartment from the trolley compartment via a cooling fluid outlet provided in the first side wall of the trolley compartment,
controlling at least one of a volume flow, a speed and a direction of flow of the cooling fluid supplied to the trolley compartment from the cooling unit in such a manner that the cooling fluid entering the trolley compartment via the cooling fluid inlet is guided first across an outer surface of a top wall of a trolley received within the trolley compartment in the case the predetermined maximum number of trolleys is received within the trolley compartment, thereafter the cooling fluid is guided across an outer surface of a side wall of the trolley which faces away from the first side wall of the trolley compartment, and finally is guided across an outer surface of a bottom wall of the trolley,
guiding a flow of cooling fluid through at least one recess provided in the region of a mounting surface of at least one guiding element mounted to an inner surface of a second side wall of the trolley compartment, wherein the mounting surface of the guiding element faces the sidewall of the trolley compartment, and wherein the guiding element further comprises a guiding surface configured to interact with the sidewall of a trolley when the trolley is pushed into the trolley compartment,
wherein the guiding element, in the region of the mounting surface facing the sidewall of the trolley compartment is provided with at least one recess allowing a flow of cooling fluid therethrough.

21. The method according to claim 20, wherein the cooling fluid is supplied to the trolley compartment via a cooling fluid inlet provided in an upper region of the first side wall, and wherein the cooling fluid is discharged from the trolley compartment via a cooling fluid outlet provided in a lower region of the first side wall.

* * * * *